United States Patent
Pannell et al.

(10) Patent No.: US 7,684,110 B2
(45) Date of Patent: Mar. 23, 2010

(54) HIGH FREQUENCY ACOUSTO-OPTIC FREQUENCY SHIFTER HAVING WIDE ACCEPTANCE ANGLE

(75) Inventors: Christopher N. Pannell, Orlando, FL (US); Jonathan David Ward, England (GB)

(73) Assignee: Gooch and Housego PLC

( * ) Notice: Subject to any disclaimer, the term of this patent is extended or adjusted under 35 U.S.C. 154(b) by 250 days.

(21) Appl. No.: 11/855,630

(22) Filed: Sep. 14, 2007

(65) Prior Publication Data
US 2009/0073543 A1    Mar. 19, 2009

(51) Int. Cl.
*G02F 1/33* (2006.01)
(52) U.S. Cl. .................................................. 359/305
(58) Field of Classification Search ............. 359/305, 359/311, 308, 287, 285, 286, 298, 312, 313, 359/314; 356/487; 372/9, 13, 20
See application file for complete search history.

(56) References Cited

U.S. PATENT DOCUMENTS

| 4,945,539 A | * | 7/1990 | Bagshaw et al. .............. 372/13 |
| 6,016,216 A | * | 1/2000 | Chang ........................ 359/285 |
| 7,375,819 B2 | * | 5/2008 | Courville et al. ............ 356/487 |

* cited by examiner

*Primary Examiner*—Scott J Sugarman
*Assistant Examiner*—Tuyen Q Tra
(74) *Attorney, Agent, or Firm*—Jetter & Associates, P.A.

(57) ABSTRACT

An acousto-optic (AO) frequency shifter includes an anisotropic crystal having an optical axis and an input face, and an acoustic transducer having electrodes affixed to the face for receiving an electrical signal and projecting an acoustic wave into the crystal. The anisotropic crystal is cut relative to the face so that the transducer is at an acoustic angle ($\theta_a$) corresponding to a predetermined angle of incidence ($\theta_i$) of an optical beam to be directed relative to the optic axis of the anisotropic crystal to substantially satisfy the parallel tangents phase matching condition.

22 Claims, 12 Drawing Sheets

HIGH FREQUENCY ACOUSTO-OPTIC FREQUENCY SHIFTER HAVING WIDE ACCEPTANCE ANGLE

FIELD OF THE INVENTION

The present invention relates to acousto-optic frequency shifters, which are also sometimes referred to as frequency translators.

BACKGROUND OF THE INVENTION

Lasers are used in a wide variety of optical sensors. The natural frequency of a laser depends on the lasing medium and the cavity optics. However, once these parameters are chosen, the emission frequency is fixed and frequency stability of the laser beam is generally very good. Thus, in a conventional Helium-Neon laser a common wavelength of operation is 632.8 nm, corresponding to a frequency of $4.7408 \times 10^{14}$ Hz. In a typical application, a pair of beams is derived from a single laser (for example using a beam-splitter), and the frequency of one of these beams is shifted by a fixed amount, such as in the tens or hundreds of MHz, as an aid to signal processing in an optical sensor-based system.

In a typical optical sensor-based system, such as a laser velocimeter or laser vibrometer, one of the beams may be used as a local oscillator, and mixed with light from the other beam after scattering from some remote moving object. This interaction will produce a carrier or difference frequency equal to the magnitude of the frequency shift. If the two beams, the local oscillator beam and the scattered and frequency shifted signal beam, are allowed to simultaneously fall on a suitable optical transducer, such as a photodiode, then a signal current will be produced which oscillates at the difference frequency, thus providing a carrier. If, now, the remote surface moves, then the signal beam will experience a Doppler shift a magnitude of which is arranged to be small compared to the static frequency shift. The result is that the photodiode (or other transducer) current will vary in frequency, i.e. the carrier frequency will be frequency or phase modulated according to the velocity of the remote surface. Electronic processing of the photodiode current or other transducer current can be used to retrieve information about the motion of the remote surface. If the motion of the remote surface is very fast, then very high frequency shifts of the optical beam are needed in order to ensure that the condition is met where the Doppler shifts are always less than the static frequency shift applied. If this condition is not met, then significant ambiguity regarding the velocity of the remote surface will be introduced, and the signal processing will not be able to correct the situation, giving rise to erroneous results.

Often, the necessary frequency shift is provided using an acousto-optic modulator (AOM), also called a Bragg cell. The AOM is generally in the form of a small enclosure typically a few cms cube, containing a suitably chosen acousto-optic crystal onto which an acoustic transducer placed between two electrodes is affixed in order to generate a traveling acoustic wave inside the crystal. The transducer thickness is chosen to match the acoustic frequency to be generated. Conventional AOM-based frequency shifters employ an isotropic type of AO interaction, in which the polarization state of the light is not changed during the diffraction process and such that the refractive index experienced by the incident and diffracted beam are the same (ni=nd).

The laser beam is incident on the crystal at $\theta_i$ through one of an opposing pair of apertures in the protective enclosure and the frequency shifted diffracted beam (which in practical applications is deviated a small angle from the incident beam) exits through the other. Because the frequency shifting process is not 100% efficient, a small amount of the residual incident beam (unshifted "zero degree" beam) also exits the Bragg cell device through the second (output) aperture. A frequency shift in the diffracted output beam is introduced by the acoustic interaction. Specifically, the diffracted beam f in order m, where m= . . . −2, −1, 0, 1, 2, . . . is the order of diffraction, will be Doppler-shifted by an amount equal to the frequency of the sound wave F.

$$f \rightarrow f + mF$$

By vibrating the AO material with a pure sinusoid and tilting the AOM so the light is reflected from the flat sound waves into the first (m=1) diffraction order, 90% or greater deflection efficiency can be achieved. Obtainable diffraction efficiencies for higher orders are much lower. Thus, practical applications, the frequency shift for the shifted beam used is +/− equal to the acoustic frequency (F).

There are well known problems relating to producing a large frequency shift (e.g. >100 MHz) using a conventional AOM. Such AOMs typically produce either a 40 MHz or 80 MHz frequency shift as standard, and are tunable over a total frequency range of approximately 30% of the designed center frequency. Thus a device having a nominal 80 MHz centre frequency will be tunable from ~68 MHz to ~92 MHz and it will usually be set to some fixed value in this range. For some applications, it is necessary to produce much larger frequency shifts, in the range of hundreds of MHz up to and beyond 1 GHz. At these frequencies, the attenuation of the acoustic beam in the AOM crystal may become very large, as the acoustic attenuation increases typically as the square of acoustic frequency (the shift frequency). Therefore, due to acoustic attenuation, special techniques and designs are generally necessary in order to be able to place the acoustic transducer very close to the path taken by the optical beam through the interaction crystal.

It is important for ease of alignment and subsequent stability of operation of the instrument, for the efficiency of production of the shifted beam within the AOM(s) to depend as weakly as possible on the angle of incidence ($\theta_i$) of the laser beam on the crystal. In conventional AOMs, it is necessary for the laser beam to be incident at the so-called "Bragg angle" which is determined and fixed during the design stage of AOM manufacture. The angular tolerance with which the laser beam may deviate from this condition in the standard (40 or 80 MHz) devices is small if they are to continue working efficiently, generally of the order of tens of milli-radians, and this makes alignment difficult.

The issue of angular acceptance is a function of more than just mechanical tolerances. In a typical well-adjusted Helium Neon laser, for example, the angular divergence of the beam (half-angle, measured to $1/e^2$ point) is ~0.5 milli-radian in air. FIG. 1 shows a simplified schematic of a conventional isotropic-type AOM 100 comprising crystal (e.g. quartz) 105 having bonded transducer 107 having effective dimensions length (L) and height (H) as shown, both being defined by the geometry of top electrode 109 as known in the art. An absorbing structure 108 is shown opposite the transducer 107. Typically, L of the crystal is 3 to 50 mm and is chosen to give the required bandwidth and efficiency. H depends on the type of application, and must exceed the laser beam diameter. The transducer thickness is chosen to match the acoustic frequency to be generated and is typically 1 to 100 µm. The incident optical beam enters clear aperture 112, which can be AR coated.

The angular acceptance of a conventional AOM is given in terms of the acoustic wavelength and the length L of the transducer top electrode.

$$\Delta\theta \approx \frac{\Lambda}{\pi L} \quad (1)$$

When using a conventional AOM crystal, at a frequency of 300 MHz, for example, the acoustic wavelength will be of the order of 10 µm, and the L is generally made to be on the order of 10 mm. Thus, $\Delta\theta \approx 0.3$ milli-radians, according to equation (1). This is of the same order as the angular divergence of the laser beam. This means that any divergence or beam misalignment in excess of this value will cause a noticeable drop in efficiency of the device. L=10 mm, H=1.5 mm is what might be expected if trying to make a frequency shifter for a laser beam operating at $f_{shift}$=300 MHz. However, if the transducer L is shortened (e.g. make L<10 mm) in an attempt to increase the angular acceptance given by equation (1), another problem arises, specifically, the inability to maintain diffraction efficiency at the previous value. Also, a transducer L=10 mm and H=1.5 mm, represents an electrode area of 15 mm$^2$, which is difficult to impedance match (to avoid power return losses) to 50 Ohms at 300 MHz, and shortening it will make it easier to match as this obviously reduces the area, and hence increases the radiation resistance. However, more RF power will be needed to drive the shorter device in order to maintain a given level of efficiency, also it is possible that the acoustic divergence from this shorter transducer will become excessively large, in which case the operation of the device will tend to move out of the "Bragg regime" and into the "Raman-Nath" regime of diffraction, which is known to be undesirable for a device of this type as multiple diffracted orders are produced, of which only a single one is useful, and thus efficiency is lowered.

More RF power can also cause excessive heating of the transducer, and the resulting temperature rise of the AO interaction crystal (which is in direct physical contact with the transducer), which can significantly alter its optical properties. This unwanted effect would include the formation of a refractive index gradient, which will tend to steer and distort the outgoing beam. If the objective is to launch the output beam into a single mode optical fiber (as is the case with most sensors described herein), these effects will adversely affect the efficiency with which light couples into the core of the output fiber. This will contribute to further reductions in overall efficiency of the AOM-based frequency shifting system.

What is needed is an AOM-based frequency shifter that provides a larger frequency shift than the frequency shift provided by currently available AOM-based frequency shifters. Such an AOM-based frequency shifter would also preferably be less sensitive to angular beam alignment as compared to currently available AOM-based frequency shifters.

SUMMARY

An acousto-optic (AO) frequency shifter includes an anisotropic crystal having an optical axis and an input face, and an acoustic transducer having a pair of electrodes affixed to the face for receiving an electrical signal and projecting an acoustic wave into the crystal. The anisotropic crystal is cut relative to the face so that the transducer is at an acoustic angle ($\theta_a$) corresponding to a predetermined angle of incidence ($\theta_i$) of an optical beam to be directed relative to the optic axis of the anisotropic crystal to substantially satisfy the parallel tangents phase matching condition (for a range of acoustical drive frequencies). The parallel tangents condition is satisfied when the group velocities of the input optical signal and the diffracted optical signal point in the same direction. As used herein, the parallel tangents condition is deemed to be substantially satisfied if the directions of input optical signal and the diffracted optical signal point differ by less than 1.0 degree, such as <0.5 of a degree.

Embodiments of the present invention utilizes the dual-polarization/parallel-tangents solution in slow-shear acoustic-mode, wherein both o-ray & e-ray polarized beams are simultaneously diffracted at the same drive frequency and input angle. In one embodiment, $-73<\theta_a<-70$ degrees and $52<\theta_i<56$ degrees, such as $-71.4<\theta_a<-71.2$ degrees, and $54<\theta_i<56$ degrees in another embodiment. Specifically, proper selection of $\theta_i$ and $\theta_a$ for a given acoustical drive frequency has been found to have the beneficial property that two diffracted beams (the +1 and the −1 orders) can be simultaneously produced from a single input beam at exactly the same wavelength. In contrast to the present invention, the $\theta_i$ angle chosen for conventional non-collinear AOTFs is at a very much lower $\theta_i$ value, usually being in the range 8 to 15 degrees to ensure that the acoustic drive frequencies are much lower.

The transducer can be a narrowband transducer having a fractional bandwidth of $\leq +/-15\%$, such as $\leq +/-5\%$. This is unlike an AOTF which is deliberately designed to have a wide bandwidth. Narrower bandwidths results in devices according to embodiments of the invention being easier to design and match and acoustic power transfer from the transducer to the AO interaction medium approaches 100%.

In one embodiment, the anisotropic crystal comprises TeO$_2$. The frequency shifter can further comprise an acoustic absorber on a surface of the crystal across from the transducer for absorbing acoustic power emanating from the transducer after it has traversed the crystal. In one embodiment of the invention the crystal has its output face parallel to its input face.

In another embodiment of the invention, retroreflectors are provided and each diffracted order is retro-reflected so that it reverse-passes through the AO cell. A first and a second retroreflector are spaced apart from the frequency shifter and positioned to receive a first polarized and a second polarized frequency shifted beam provided by the frequency shifter, the first and a second retroreflector directing the first and a second frequency shifted beam back though the frequency shifter. For a 309 MHz acoustical drive, a further shift of 309 MHz is provided for each beam in this embodiment. Thus, for a 309 MHz acoustical drive, for example, a single device will provide a total frequency-shift in excess of 1 GHz from a single input laser beam without the need for a high-frequency RF drive with all that that will entail in terms of broadband transducer design and impedance-matching.

A frequency shifting system according to one embodiment of the invention comprises an AOFS comprising anisotropic crystal having an optical axis and an input face, an acoustic transducer affixed to the face, the transducer having electrodes for receiving an electrical signal and projecting an acoustic wave into the crystal. An optical beam source is for providing an optical beam, the optical beam being aligned with the anisotropic crystal to be incident on the anisotropic crystal at a predetermined angle of incidence ($\theta_i$) relative to said optical axis. The anisotropic crystal is cut relative to the face so that said transducer is at an acoustic angle ($\theta_a$) corresponding to said predetermined angle of incidence ($\theta_i$) to substantially satisfy the parallel tangents phase matching condition. An RF source is coupled to the electrodes for providing the electrical acoustic drive signal.

The optical beam can be a single fixed frequency beam which includes both e and o polarizations in substantially equal amounts, such as a circularly polarized beam, an unpolarized beam, or a linearly polarized beam oriented at 45° relative to the optical (z) axis of the crystal. These conditions can be met in practice using polarization controllers or by using polarization preserving optical fibers in fiber systems. Also, the angular aperture of the device is a maximum at this value of $\theta_i$. All these three (3) embodiments will ensure substantially equal amounts of e and o polarized radiation are input to the device. For example, using a 309 MHz drive signal, there will be two diffracted output beams produced, one on either side of the continuation of the input beam; up-shift and down-shift at about 309 MHz, thus they will be about 618 MHz apart. Conventional AO frequency shifters producing this amount of frequency shift by means of a single diffracted output beam are generally impossible because of the high degree of acoustic attenuation of the acoustic wave.

The anisotropic crystal can comprise $TeO_2$ and the system operated in a polarization independent condition to obtain two simultaneous output optical beams, one up-shifted and one down-shifted by equal amounts. The polarization independent condition can comprises $-73<\theta_a<-70$ degrees and $52<\theta_i<56$ degrees, such as in one embodiment $-71.4<\theta_a<-71.2$ degrees, and $54<\theta_i<56$ degrees. In another embodiment, the system further comprises an acoustic absorber on a surface of the crystal across from the transducer for absorbing acoustic power emanating from the transducer after it has traversed the crystal. The system can further comprise a first and a second retroreflector spaced apart from the frequency shifter and positioned to receive a first polarized and a second polarized frequency shifted beam provided by the frequency shifter, wherein the first and a second retroreflector are arranged to direct the first and a second frequency shifted beam back though the frequency shifter.

A method of frequency shifting an optical beam using an acousto-optic device, comprising the steps of interacting a traveling acoustic wave having a fixed frequency of at least 100 MHz with a single polarized optical beam in an anisotropic crystal, wherein parameters of the acoustic beam and said optical beam substantially satisfy the parallel tangents phase matching condition. The interaction step generates a pair of orthogonally polarized output beams, each of the polarized output beams having an equal and opposite frequency shift relative to an input optical frequency of the optical beam, and wherein a total frequency shift between the pair of output beams is twice a frequency of an input radio frequency signal applied to an acoustic transducer coupled to the anisotropic crystal. The method can further comprise the step of reflecting the pair of output beams back to repeat the interacting, so as to double a frequency separation between the pair of output beams without using increased acoustic drive power. The resulting frequency separation in one embodiment (e.g. acoustic wave frequency is at least 250 MHz) is over 1 GHz.

The method can further comprise the step of reflecting the acoustic wave from one or more optical faces of said anisotropic crystal the interacting step. The optical beam can be a single fixed frequency beam which includes both e and o polarizations in substantially equal amounts, such as a circularly polarized beam, an unpolarized beam, or a linearly polarized beam oriented at 45° relative to the optical axis.

BRIEF DESCRIPTION OF DRAWINGS

A fuller understanding of the present invention and the features and benefits thereof will be obtained upon review of the following detailed description together with the accompanying drawings, in which:

FIG. 2(a) shows a schematic of a conventional non-collinear AO-device based on $TeO_2$, while FIG. 2(b) is an accompanying k-vector diagram which explains the operation of the device. Only the optical k-vector which fits in the scattering triangle is strongly diffracted.

DETAILED DESCRIPTION OF THE INVENTION

Embodiments of devices according to the invention described herein are acousto-optic (AO) frequency shifters capable of providing shifts in the hundreds of MHz for a single optical beam. Using double-passing, such as provided by utilizing a retroreflector, frequency shifts of over 1 GHz can be obtained. Embodiments of the present invention use an AO interaction in an anisotropic (birefringent) crystal which has previously only been applied in the context of AOTFs.

In a conventional AOTF, it is customary to use an anisotropic acousto-interaction in which the input state of polarization (assumed linear) is "flipped" to the orthogonal state in the process. The function of the conventional AOTF device is to realize the desired electronically programmable optical filter which can be tuned rapidly over a wide range of center wavelengths, possibly an octave or more. This tuning aspect requires a broadband transducer and a complex electrical matching network. In such a conventional AOTF, a frequency shift is also produced on the output beam as a natural consequence of the acousto-optic interaction. As known in the art, there is a direct relationship between the magnitude of the frequency shift and the optical input angle of the incident light ($\theta i$). However, for the conventional AOTF the frequency shift is usually limited to no more than tens of MHz because of the lower value of $\theta i$ required for AOTF operation. Specifically, a conventional AOTF can accept incident light having a maximum half-cone angle of only approximately 5 degrees. The frequency shift thus provided by conventional AOTFs is unimportant in optical terms.

In contrast, because acousto-optic (AO) frequency shifters devices according to embodiments of the present invention are used with a laser or other light source providing a fixed optical frequency to provide frequency shifted outputs, it is unnecessary to provide a broadband transducer or complex electrical matching network as would be the case with an AOTF.

Figure 1:
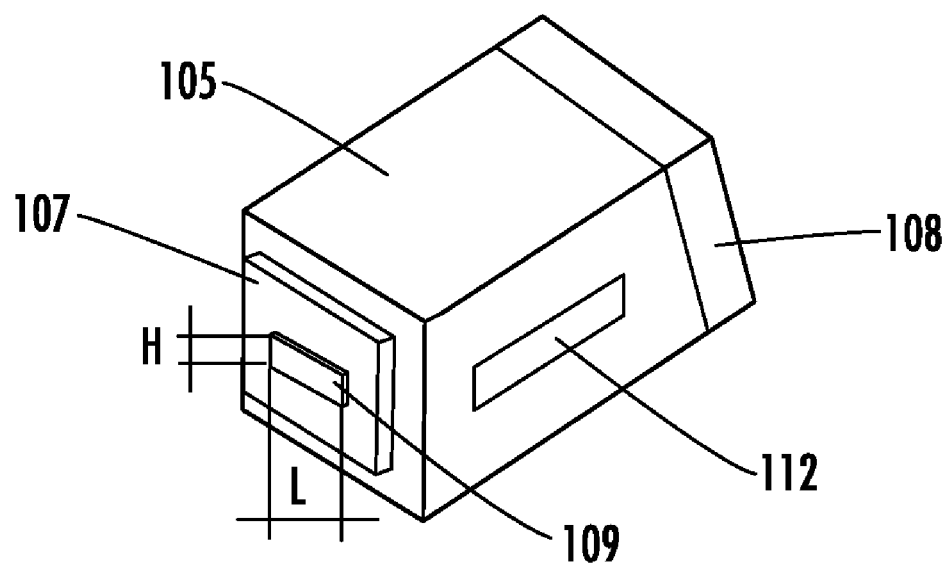
FIG. 1 shows a simplified schematic of a conventional isotropic-type AOM with a rectangular transducer top electrode having dimensions L and H shown.
Figure 2:
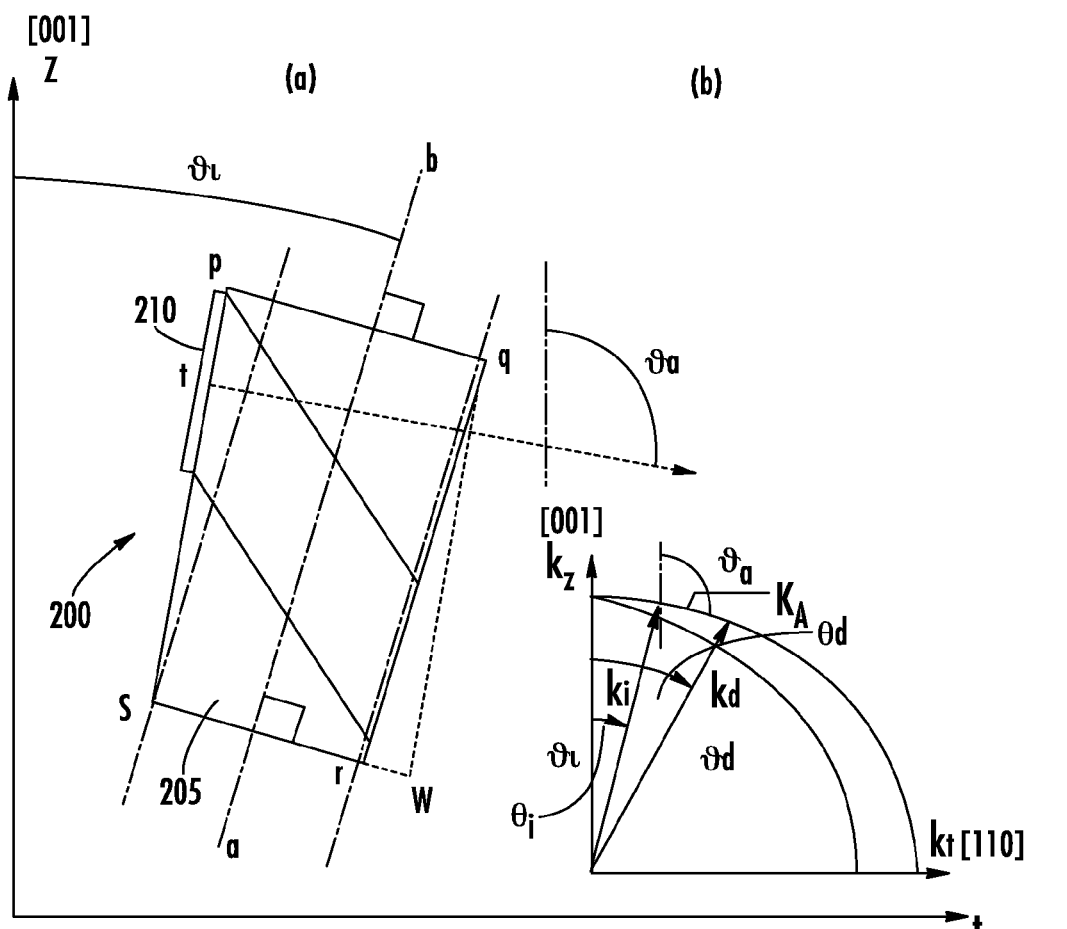

FIG. 2(*a*) shows a schematic of a non-collinear AO device 200, while FIG. 2(*b*) is an accompanying k-vector diagram which explains the operation of the device, where the device and k-vector diagram are shown oriented relative to orthogonal T and Z axes of the AO material, shown as [110] and [001], respectively, as would be the case for tetragonal crystals such as $TeO_2$, or similar cubic crystals. Tetragonal crystal lattices result from stretching a cubic lattice along one of its lattice vectors, so that the cube becomes a rectangular prism with a square base (a by a) and height (c, which is different from a).

Prior to the present invention, a device having a structure similar to device 200 shown in FIG. 2(*a*) had only been used as an AOTF. The anisotropic interaction occurs in an optically anisotropic (birefringent) material 205, assumed to be $TeO_2$. Transducer 210 is bonded to $TeO_2$ crystal 205. An acoustic wave (Va) is shown emanating from transducer 210. Walk-off is shown by the two parallel lines starting on the transducer 210 and sloping diagonally downwards, which define the direction in which acoustic energy flows in the crystal. The arrow at right angles to the transducer surface 210 represents the phase velocity direction, thus the energy flow direction (i.e. group velocity direction) is at a non-zero angle to the phase velocity direction.

FIG. 2(*b*) is a schematic diagram representing one plane containing the optic axis (Kz) of the $TeO_2$ crystal 205 which shows an incident optical wave vector $K_I$, the acoustic wave vector $K_A$, and the resultant wave vector Kd of the diffracted wave. Only the optical k-vector $K_I$ which fits in the scattering triangle shown in FIG. 2(*b*) is strongly diffracted, this diffracted beam being the output of device 200. As the length in k-space of the diffracted k-vector (Kd)=$2\pi n_d/\lambda$, where $n_d$ is the refractive index associated with the diffracted wave (path/direction in the crystal 205), and $\lambda$ is the free space wavelength of the input beam, it can be seen that the length of $K_d$ fixes the wavelength at which diffraction occurs. The length of the acoustic k-vector $K_A$ is likewise defined as $2\pi/\Lambda$, where $\Lambda$ is the acoustic wavelength and is defined in turn by $\Lambda=V_A/f$ where $V_A$ is the acoustic velocity of the AO interaction crystal and f is the RF frequency applied to the transducer (T).

The case shown in FIG. 2(*b*) is the so-called "o-incident" case, in which the input laser (or other optical) beam is o-polarized, and the output beam via polarization flipping is orthogonally polarized, thus being e-polarized. However, by symmetry, it is possible to utilize the opposite situation, i.e. an input beam being e-polarized, giving rise to an output beam which is o-polarized. In this latter case the sense of the frequency shift will be reversed, up-shift becoming down-shift, and vice versa.

Figure 4:
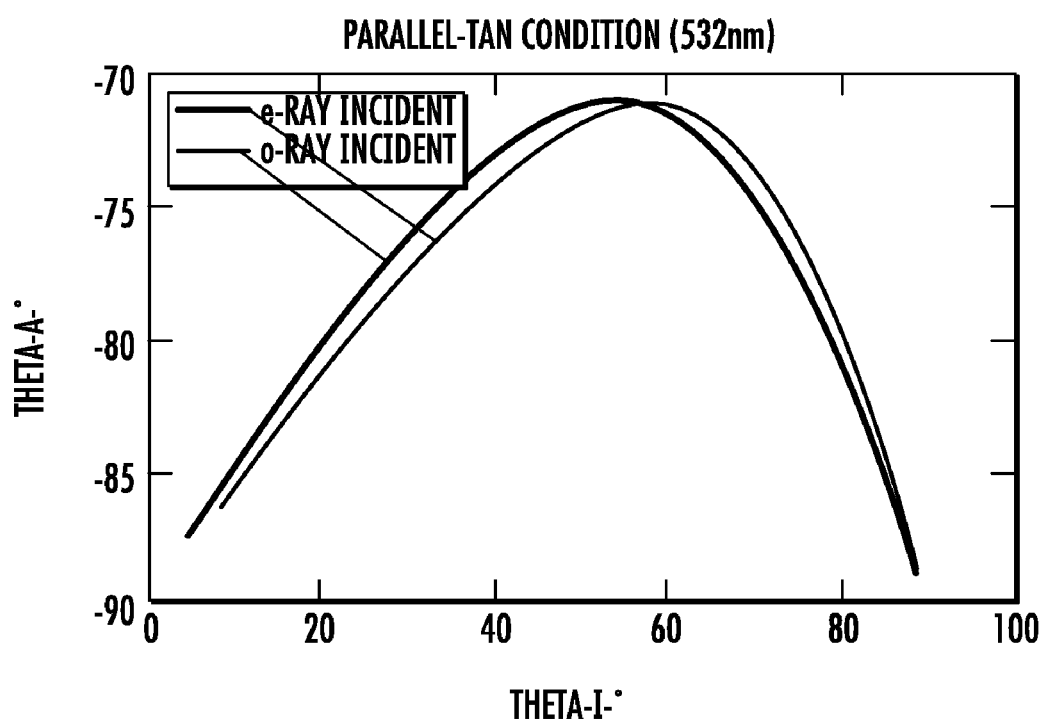
FIG. 4 is a theoretical plot of acoustic beam angle ($\theta_a$) as a function of optical input angle ($\theta_i$), for the parallel tangents condition (wide aperture condition) to be satisfied at 532 nm, for the e-incident and o-incident cases, according to an embodiment of the invention. The angles are both measured relative to the crystal optic axis (z-axis), clockwise positive, as is the convention in the acousto-optics literature.
Figure 5:
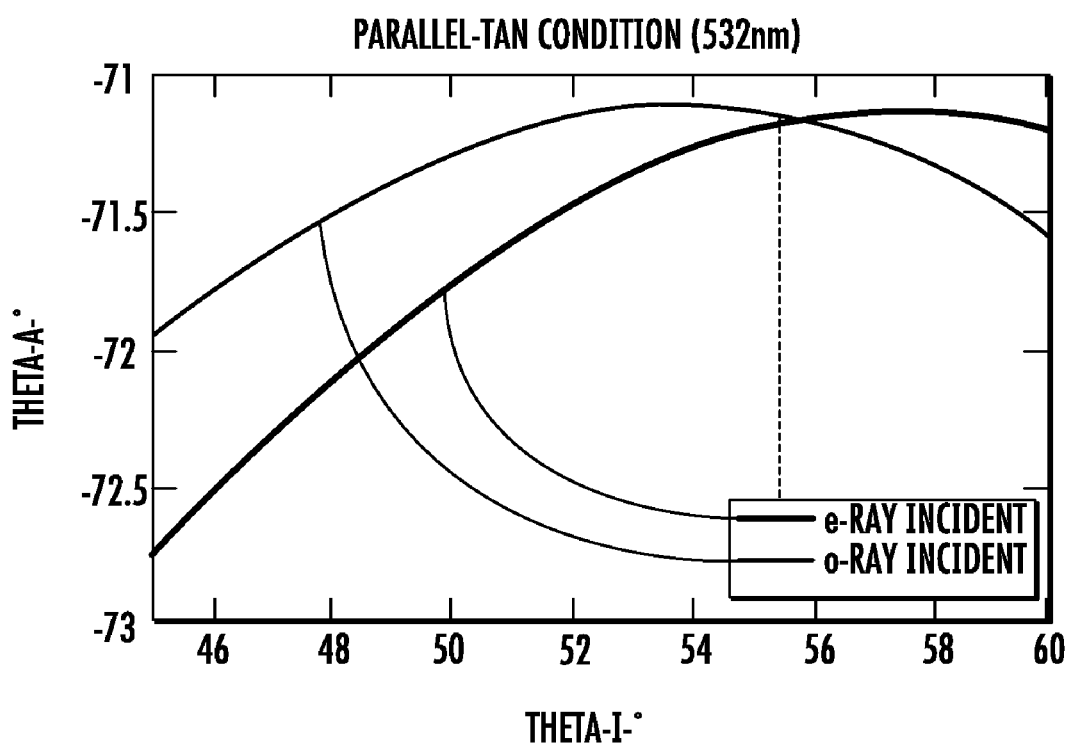
FIG. 5 is an expanded version of FIG. 4 for the range $45°<\theta_i<60°$ more clearly showing the crossing point (the polarization independent case).

A large angular field of view for the input optical wave can be achieved by exploiting parallel tangents phase matching, as shown relative to FIG. 2(*b*). For a given input wave vector $K_I$, there will be an infinite number of acoustic wave vectors which satisfy the phase matching condition by joining the two surfaces $n_1$ and $n_2$, but there will be one particular value (in the relevant quadrant) of the acoustic wave vector Ka which connects points on the two index ellipsoid surfaces whose tangents $T_1$ and $T_2$ are parallel. This geometry ensures that the length of the acoustic vectors required to diffract a given wavelength of incident light are the same over a substantial input field of view (FOV), i.e. for incident wave vectors $K'_I$ to $K''_I$. Thus, by selecting (i) an appropriate angle ($\theta a$) through appropriately cutting the crystal 205 and (ii) magnitude for the acoustic vector (a) the parallel tangents condition can be satisfied for a particular incident angle ($\theta i$). The relationship between these angles is represented in FIGS. 4 and 5 described below.

The angular acceptance of the anisotropic interaction provided by devices according to the present invention which operate in the so-called "parallel tangents condition" is significantly larger than could possibly be obtained with the conventional type of AOM employing an isotropic type of AO interaction, which is typically only several degrees.

An anisotropic material for devices according to the invention can be tellurium dioxide, also known as paratellurite (chemical formula=$TeO_2$). $TeO_2$ is a material frequently used in the acousto-optics industry for making AOTFs. It has a high acousto-optic figure of merit, M2, which means that relatively small amounts of radio frequency (RF) drive power are required to produce efficient diffraction. The frequency-shifted beam is produced by diffraction of the input beam from the region of the crystal where the acoustic wave generates periodic variations of refractive index, an acoustically created "moving volume diffraction grating". Due to anisotropy of the crystal, the refractive indices for the incident (ni) and diffracted (nd) optical beam differ due to the birefringence of the material. Although the present invention is described using a tellurium dioxide crystal, the invention is in no way limited to tellurium dioxide. For example, mercurous chloride, mercurous bromide, thallium arsenic selenide (TAS), or KDP may also be used.

The M2 figure of merit is defined as follows:

$$M2 = \frac{n_o^3 n_e^3 p^2}{\rho V^3}$$

Where $n_o$, $n_e$ are the ordinary and extraordinary indices of refraction respectively, p is the strain-optic coefficient for the material (in this case $TeO_2$), $\rho$ is the density in kg/m³ of the material, and V is the acoustic velocity.

Generally, for proper operation of devices according to the invention, both o and e orthogonal polarizations should be present in the incident beam, both being in substantially equal intensities in one embodiment. The dual polarizations can be provided in a circularly polarized beam, an unpolarized beam, or a linearly polarized beam orientated at 45°. If a linearly polarized laser beam is used for an input to devices according to the present invention it is linearly polarized 45° relative to the optical axis of the crystal, to provide equal amounts of e-polarized and o-polarized light. As described above, due to polarization flipping provided by the anisotropic AO crystal, the e-incident component of the input produces an o-polarized output and the o-polarized component of the input produces an e-polarized output. The e and o polarized output beams are deviated away from the residual (undiffracted) input beam in opposite senses as a consequence of the acousto-optic interaction, and thus emerge from the output face of the AO interaction crystal on opposite sides of this residual beam.

Figure 3:
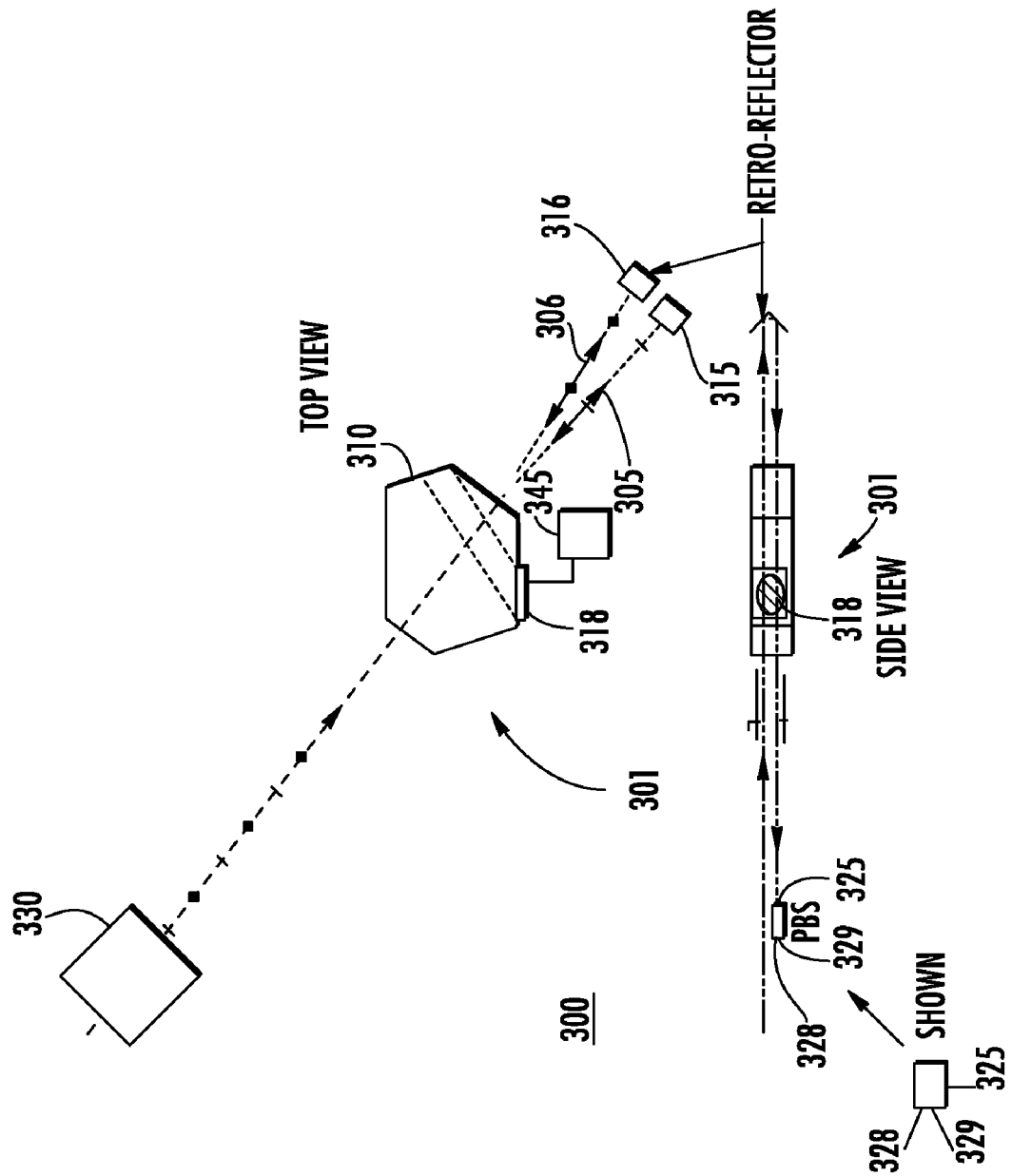
FIG. 3 is a schematic diagram of a dual polarization AO frequency shifter according to an embodiment of the present invention, including a top view and a side view. The frequency shifter shown includes two optional retro-reflectors to pass the respective frequency shifted beams back through the device to double the frequency shift provided.

FIG. 3 is a simplified schematic diagram of a dual polarization AO frequency shifter system 300 according to an embodiment of the present invention, providing a top view and side view. Shifter 301 includes anisotropic crystal 310 having transducer 318 is bonded thereto. RF generator 345 is coupled to the pair of electrodes (not shown) across transducer 318. The frequency shifter shown includes optical beam source 330, such as a narrowband laser, and two optional retro-reflectors 315 and 316 to pass the respective frequency shifted diffracted beams 305 and 306 back through the device 301 to double the frequency shift. The optical (e.g. laser) cavity, is not shown. Retroreflectors 315 and 316 increase (double) the total frequency shift. Each diffracted order is thus retro-reflected so that it reverse-passes through the AO cell, passing through twice thus providing a further shift of 309 MHz (for a 309 MHz acoustical signal) for each beam. A polarization-sensitive beam-splitter (PBS) 325 can be used to separate the beams. Orthogonal polarizations 328 and 329 finally emerging from the device 300 are now approximately 1.236 GHz apart.

With reference to FIG. 3, the retroreflectors 315 and 316 will generally be placed close to the shifter 301, typically a few cms away. In one embodiment, the shifter 301 and retroreflectors 315 and 316 can be packaged into a common enclosure.

In operation of dual polarization AO frequency shifter system 300, the returning beams will travel back parallel to the outgoing beams (305, 306 in the top view) and re-enter the shifter 301. This aspect is shown more clearly in the side view provided. The spacing between the outgoing and returning beams is generally controlled so that the two are spatially separated, but the spacing is such that the returning beam is still within the sound field of the acoustic transducer and so experiences diffraction a second time. On re-entering the shifter 301, the returning beams thus traverse a path which is parallel and close to the original path, but in the opposite direction. These returning beams (lower beam in the side view of FIG. 3) diffract and combine into a single beam which exits the shifter 301 on the left side in the side-view. This beam is comprised of spatially overlapping H and V-polarized components, with a frequency difference between them equal to 4× the drive frequency applied to transducer 318 as described above. On exiting the shifter 301, this beam is incident on PBS 325 which has the property of sending the H-polarized component in one direction and the V-polarized component in the other, thus achieving spatial separation between the two orthogonally polarized (and frequency shifted) beams. These spatially separated and frequency shifted beams are then available for use in the system, such as a sensor system in one embodiment.

It is well known to those having ordinary skill in the art that for general angles of incidence $\theta_i$, two slightly different RF frequencies are required to cause diffraction of o⇒e and e⇒o. Typically, the difference in drive frequencies needed to cause diffraction of a given wavelength in the e and o-cases is less than 5 MHz. Thus, for a single wavelength input beam (e.g. from a conventional narrowband laser) and for a single RF drive frequency, only one or the other polarization component could be selected, but not both simultaneously. A notable exception identified by the present inventors for use with the present invention in one embodiment of the present invention is for certain i, a combinations when 52°<i<56° and −73°<a<−70°, such as i of about 55.177° and a about 71.177° in one embodiment. This result is largely independent of the particular material, because to first order it does not depend on any material-specific parameters. To a "first order" as used herein refers to the lowest order correction term in the following form:

$$\left(\frac{n_e n_o}{n_o}\right)^2$$

Since the respective refractive indexes for the e and o-cases for materials are known to be close to one another (e.g. within 5%), the above second order ratioed correction term is generally a very small (material specific) quantity which can be ignored to a first approximation. For example, the e-indices and o-indices are of the order of 2.4 and 2.3 respectively in $TeO_2$ operating in the visible part of the spectrum, so the fractional difference in e and o indexes is of the order of 4%. With differences of about 4%, the square of the fractional difference (equation above) is of the order of 0.002 and can thus be ignored for most purposes.

Thus, since the cut of the crystal effectively determines a, using a crystal (e.g. $TeO_2$) cut using these values, it is possible to simultaneously satisfy the parallel tangents condition described above (thus ensuring a wide angular acceptance) and a set of conditions for both o⇒e and e⇒o. Thus, using this design and the operating conditions so that the polarization of the input beam (being a vector) is adjusted to have equal components in the o and e directions (e.g. using either unpolarized light, light polarized at 45 degrees, or circularly polarized light, each of these cases will produce equal excitations of the o and e "channels"), a single RF drive frequency can be used to simultaneously produce the respective output beams from a single laser source. In all these cases, beam alignment should be undertaken so that the central rays are at $\theta_i$, or nearly at $\theta_i$. This is generally done during manufacture by cutting the crystal input and output faces so that the rays entering at the "correct" angle are perpendicular to the input face. As described above for the present invention, with a particular value of θi the angular tolerance of input rays provided is generally quite large anyway.

As an added feature, the angular aperture reaches a maximum at the parallel tangents condition. The RF frequencies needed to satisfy phase matching and therefore generate the diffracted output beams are generally high. For example, the expression for the frequency shift achievable at a particular wavelength is approximately given by:

$$f = \frac{(n_e - n_o)V}{\lambda_o}[\sin^2(2\theta_i) + \sin^4(\theta_i)]^{1/2}$$

where V is the acoustic velocity, f is the RF frequency and λo is the wavelength diffracted at this frequency. It can be seen the frequency shift depends on $\theta_i$ and becomes very large for large $\theta_i$ which is used by the present invention which as described above is generally operated at 52°<$\theta_i$<56° to substantially satisfy the parallel tangents phase matching condition.

The acoustic loss associated with these high frequency acoustic waves can be correspondingly high and special care should generally be taken in the design to limit acoustic loss. Because the acoustic drive frequencies are generally regarded as being too high in the $\theta_i$=55.177° case for the construction of practical AOTFs, prior to the present invention it remained largely a curiosity without practical application. However, for frequency shifters according to the invention, the present Inventors have discovered new ways to substantially overcome these problems.

A prototype device according to the present invention was designed to operate at an exemplary wavelength of 532 nm (green light). FIG. 4 shows a theoretical plot of acoustic beam angle $\theta_a$ as a function of optical input angle $\theta_i$, for the parallel tangents condition (wide aperture condition) to be satisfied at 532 nm, for the e-incident and o-incident cases. Specifically, the relation between any chosen value of $\theta_i$ and the corresponding acoustic angle $\theta_a$ needed to achieve the parallel tangents condition. The angles are both measured relative to the crystal optic axis (z-axis), clockwise positive, as is the convention in the acousto-optics literature. As shown in FIG. 4, in theory, the condition for simultaneous operation at dual-polarization/parallel-tangents occurs when $\theta_i$=55.177° & $\theta_a$=−71.177°. This is shown by the two curves (e-ray and o-ray incident) crossing (intersecting) as shown in FIG. 4. An expanded version of FIG. 4 for the range 45°<θι<60°, showing more clearly the crossing point, i.e. the polarization independent case, is shown in FIG. 5.

Figure 6:
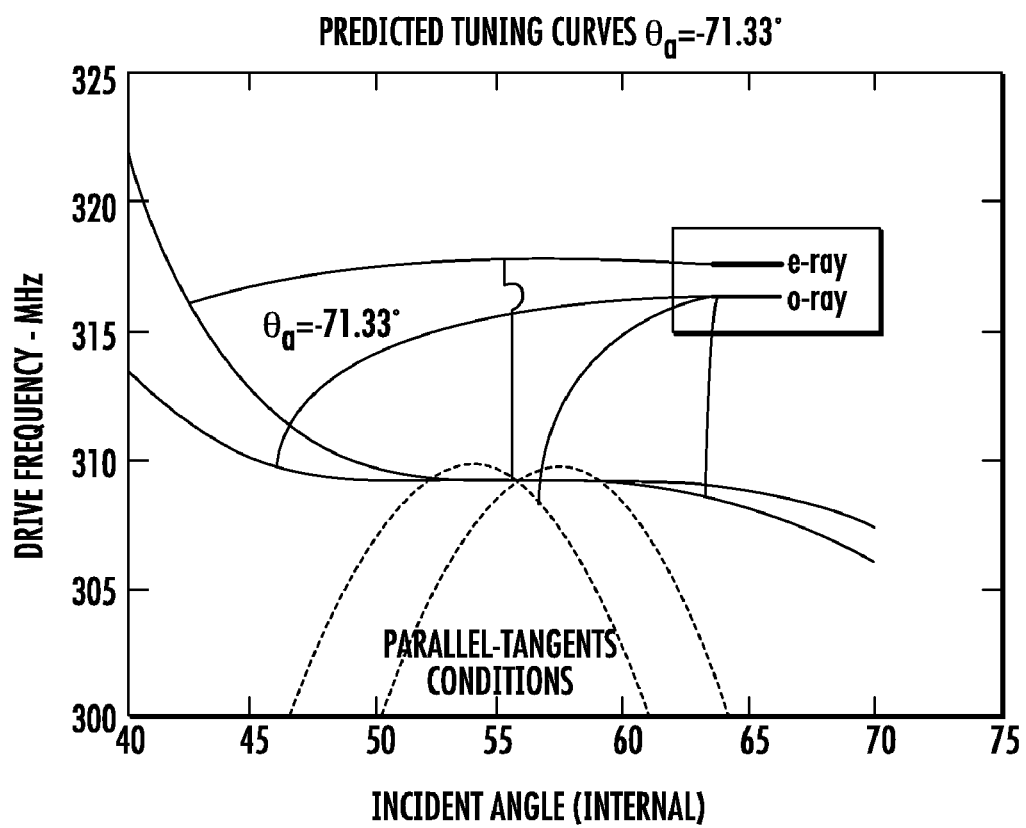
FIG. 6 shows theoretical plots according to an embodiment of the invention for tuning curves showing the RF drive frequency (y-axis; in MHz) as a function of $\theta_i$ (x-axis) for $\theta_a=-71.33°$ for both the e and o ray incidence cases. The two dashed lines shown approximate the regions in which the parallel tangents condition can be satisfied as $\theta_a$ is allowed to vary (see FIG. 5 for a more detailed view).

Theoretical tuning curves showing RF frequency as a function of θi for $\theta_a$=−71.33° for the e and o ray incidence cases are shown in FIG. 6. The crossing point shows that the drive frequencies become equal at one particular value of $\theta_i$, this is the polarization independent condition. The solid lines represent the tuning curves for o & e-rays with $\theta_a$=−71.177°, and the dashed lines represent the how the tuning-curves would appear if $\theta_a$ were to be constrained to the parallel-tangents condition as $\theta_i$ varied. It can be seen from FIG. 6 that the dual polarization case happens to occurs almost at the maximum drive frequency possible for the parallel-tangents case. This is a useful result in this situation where large frequency shifts are the objective.

Figure 7:
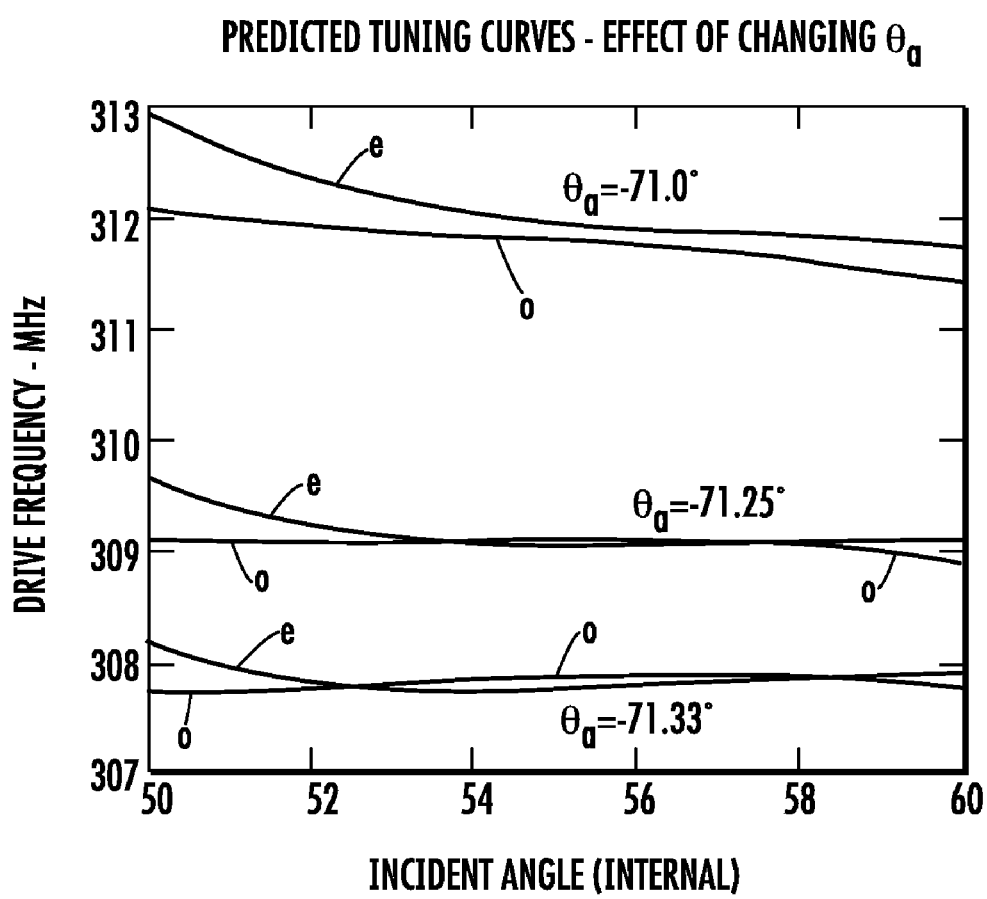
FIG. 7 shows theoretical plots of tuning curves according to an embodiment of the invention showing RF drive frequency (in MHz) as a function of $\theta_i$ (x-axis) on an expanded scale, showing the effects of departing slightly from the case $\theta_a=-71.33°$.
Figure 8:
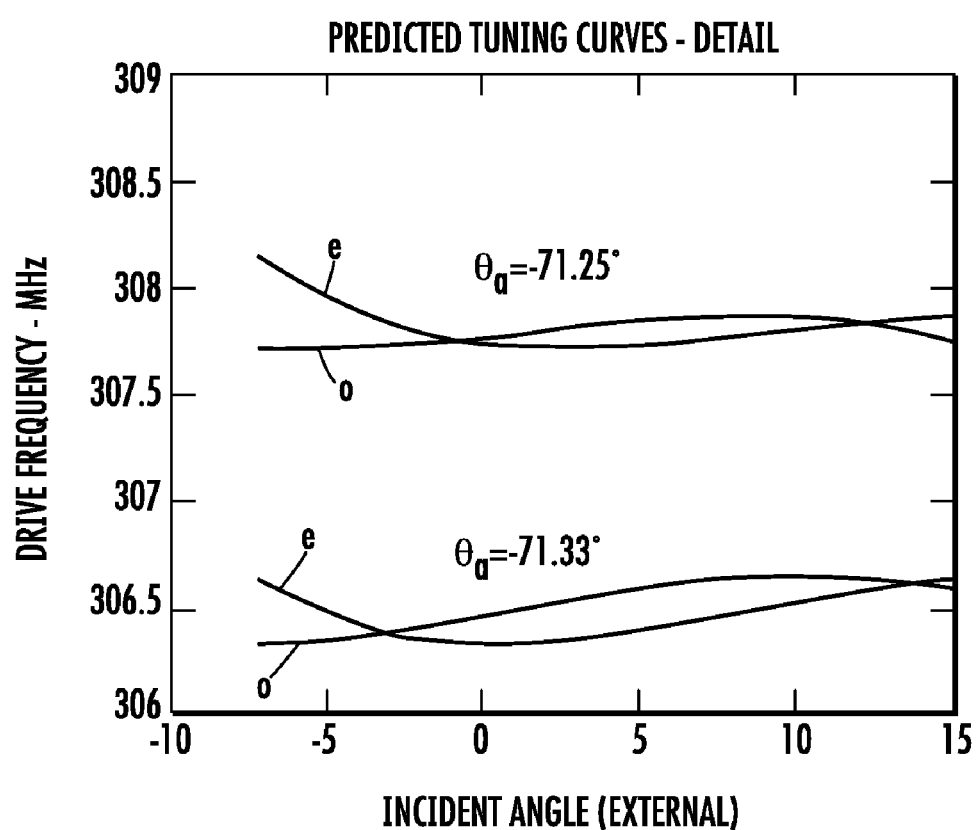
FIG. 8 shows theoretical plots of tuning curves according to an embodiment of the invention showing RF frequency (in MHz) as a function of $\theta_i$ expanded further, showing the effects of departing slightly from the case $\theta_a=-71.33°$, this is done for the purpose of assessing the effects of tolerencing in manufacture.

Assuming monochromatic operation, from the theoretical tuning-curves shown in FIGS. 7 & 8 it can be seen that as $\theta_a$ decreases (i.e. gets more negative) from approximately $\theta_a$=−70°, firstly there is no condition for simultaneous dual-polarization operation (e-ray and o-ray curves always apart), then as $\theta_a$ gradually decreases further the two curves just touch (at the parallel tangents condition). Further reduction of $\theta_a$, leads to a situation where the curves intersect at two distinct points. Since as described above $\theta_i$ is a function of $\theta_a$ to meet the parallel tangents condition, two available $\theta_a$ values equates to two discrete operating points at two different incident angles $\theta_i$. To allow for manufacturing tolerances, temperature fluctuations and uncertainties in the reported data for $TeO_2$ or other anisotropic crystals, the target design should be "offset" slightly from the ideal to make ensure the ability to simultaneously get the two outputs at good efficiency at some RF drive frequency close to the predicted one even if the crystal angles (defining $\theta_a$) are near the ends of the manufacturing tolerance bands.

Figure 9:
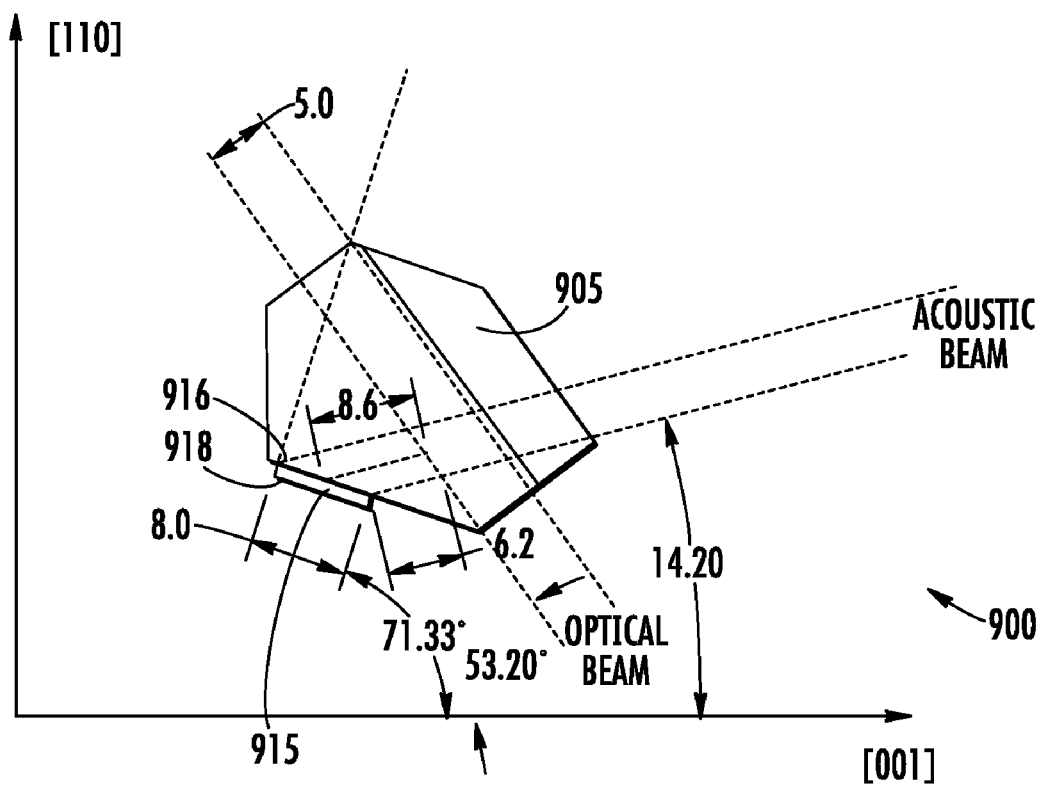
FIG. 9 is a schematic diagram of a dual polarization AO frequency shifter according to an embodiment of the present invention.

The schematic of a dual-polarization AOFS 900 according to an embodiment of the present invention built using a $TeO_2$ crystal 905 to the design shown in FIG. 9 used the design parameters $\theta_i$=53.2°; $\theta_a$=−71.33° is shown aligned relative to the [001] and [110] crystal axes of $TeO_2$. Exemplary dimensions (in mm) are also shown. The acoustic transducer 915 can be seen at the lower left having an effective length (L) of 8 mm, and the path of the acoustic beam is also shown. A pair of electrodes 916 and 918 is across transducer 915. The direction of the acoustic beam is slanted with respect to the transducer normal direction shows "walk-off" due to the large acoustic anisotropy of the crystal, in this case $TeO_2$. The significance of walk-off is that the $TeO_2$ crystal is generally cut to accommodate it, and this means that a larger crystal is required than if walk-off was not present. Using large value of $\theta_i$ leads to a correspondingly large value for $\theta_a$ to satisfy the parallel tangents condition in turn leads to a high degree of walk-off. This is generally unavoidable unless the material is changed. In one embodiment of the invention an acoustic absorber structure (not shown in FIG. 9) is provided for absorbing the acoustic power after it has traversed to the opposite side of the crystal 905, to prevent reflection of acoustical wave energy if not absorbed efficiently which can cause spurious signals to appear.

Figure 10:
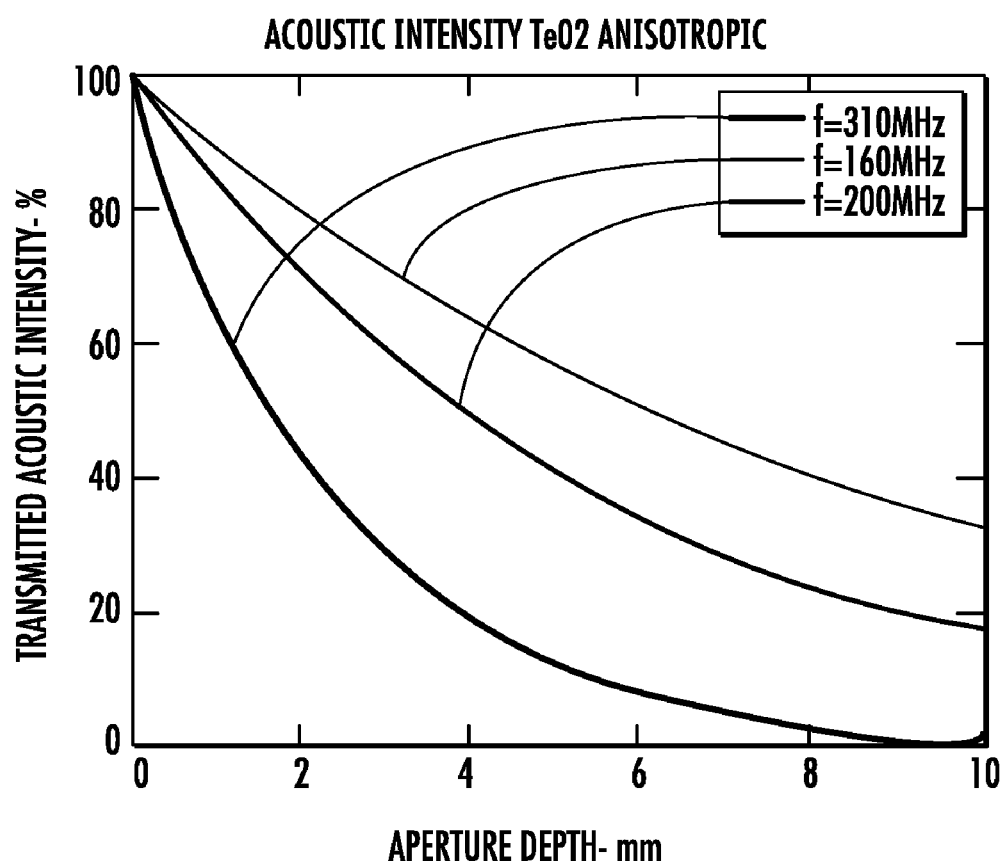
FIG. 10 shows plots of transmitted acoustic intensity (in %) according to an embodiment of the invention as a function of travel distance (shown as aperture depth) from the transducer, for three different RF drive frequencies, showing the rapid increase in attenuation of the acoustic wave with increasing RF drive frequency.

FIG. 10 shows acoustic intensity percentage remaining after traveling a certain distance from the transducer (T), for three different RF drive frequencies (160 MHz, 200 MHz, and 310 MHz), as a function of aperture depth. This data demonstrates the rapid increase in attenuation of the transmitted acoustic wave with increasing RF drive frequency.

AO frequency-shifters according to the present invention are expected to have broad application to a wide range of systems which require frequency shifts of hundreds of MHz or more, while maintaining a large angular acceptance aperture and low drive power requirements. Moreover, the wide angular acceptance provided by frequency-shifters according to the present invention facilitates initial alignment when incorporated into in a piece of optical sensing equipment, such as an optical vibrometer. Once this alignment is achieved, the alignment will be very stable against any mechanical changes, shocks etc. which may be encountered later in "field operation" of the device. Other systems that can befit from the present invention, include, but are not limited to, velocimeters and laser remote vibration sensors (laser vibrometers).

EXAMPLES

It should be understood that the Examples described below are provided for illustrative purposes only and do not in any way define the scope of the invention.

Figure 11:
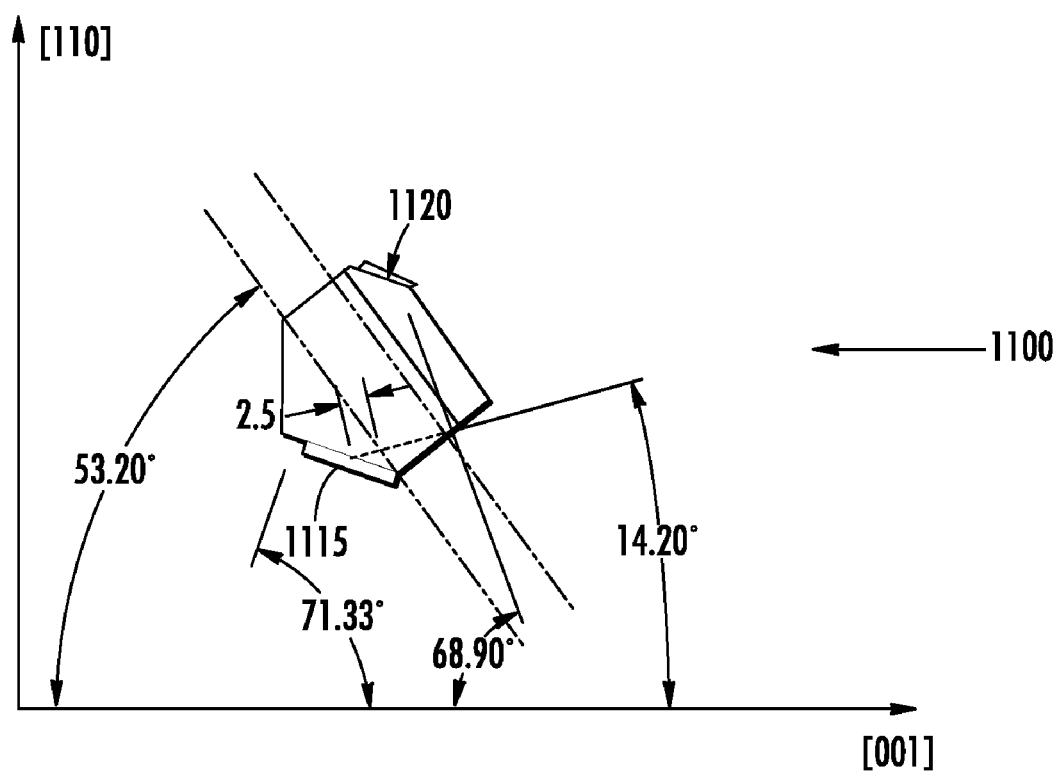
FIG. 11 is a schematic diagram of a dual polarization AO frequency shifter according to an embodiment of the present invention which includes an acoustic absorber shown as "A", found to provide good performance.

FIG. 11 is a schematic diagram of a dual polarization AO frequency shifter 1100 according to an embodiment of the present invention designed for minimum acoustic attenuation which includes an acoustic absorber 1120, found to provide good performance. The prototype AO frequency shifter 1100 was fabricated for use in a laser Doppler velocimetry (LDV) system. In order to make room for acoustic absorber 1120, the transducer 1115 was located away from the output face of the TeO$_2$ crystal so as to allow for the walk-off of the acoustic beam. The transducer electrodes are not shown.

When AO frequency shifter 900 shown in FIG. 9 was tested, all aspects of the performance measured were in accordance with the design calculations/simulations, i.e. simultaneous dual-polarization (e and o polarization) diffraction occurred at approximately 309 MHz. However, the diffraction efficiency was found to be low—approximately 3% per channel at 1 W RF drive power. This was primarily due to acoustic absorption. For the slow-shear acoustic mode in TeO$_2$ this resulted in more than 90% of the acoustic intensity being attenuated.

AO frequency shifter 1100 was found to improve the efficiency and reduces the RF drive power requirement as compared AO frequency shifter 900 by placing the interaction zone closer to the transducer 1115 (2.5 mm from the transducer center-interaction zone center for AOFS 1100 shown in FIG. 11 as compared to 6.6 mm from for AOFS 900 shown in FIG. 9). The design shown in FIG. 11 reflects the acoustic wave from the output face after the acousto-optic interaction has occurred, thus allowing the interaction zone to be very close to the transducer, and thus minimizes the acoustic attenuation between the transducer and optical beam. A significant factor is the management of the acoustic wave after it has been reflected in a controlled way from the output optical face of the AOTF. The output face angle selected directs the sound towards an acoustic absorber, such as absorber 1120, when placed on a suitable surface of the crystal, such as by using the geometrical construction shown in FIG. 12.

Calculations confirmed that this could be achieved by designing the AO crystal to have its output face parallel to its input face as shown in FIG. 11. This is generally an ideal solution as it is simple to manufacture, and was found to make alignment relatively straightforward.

Figure 12:
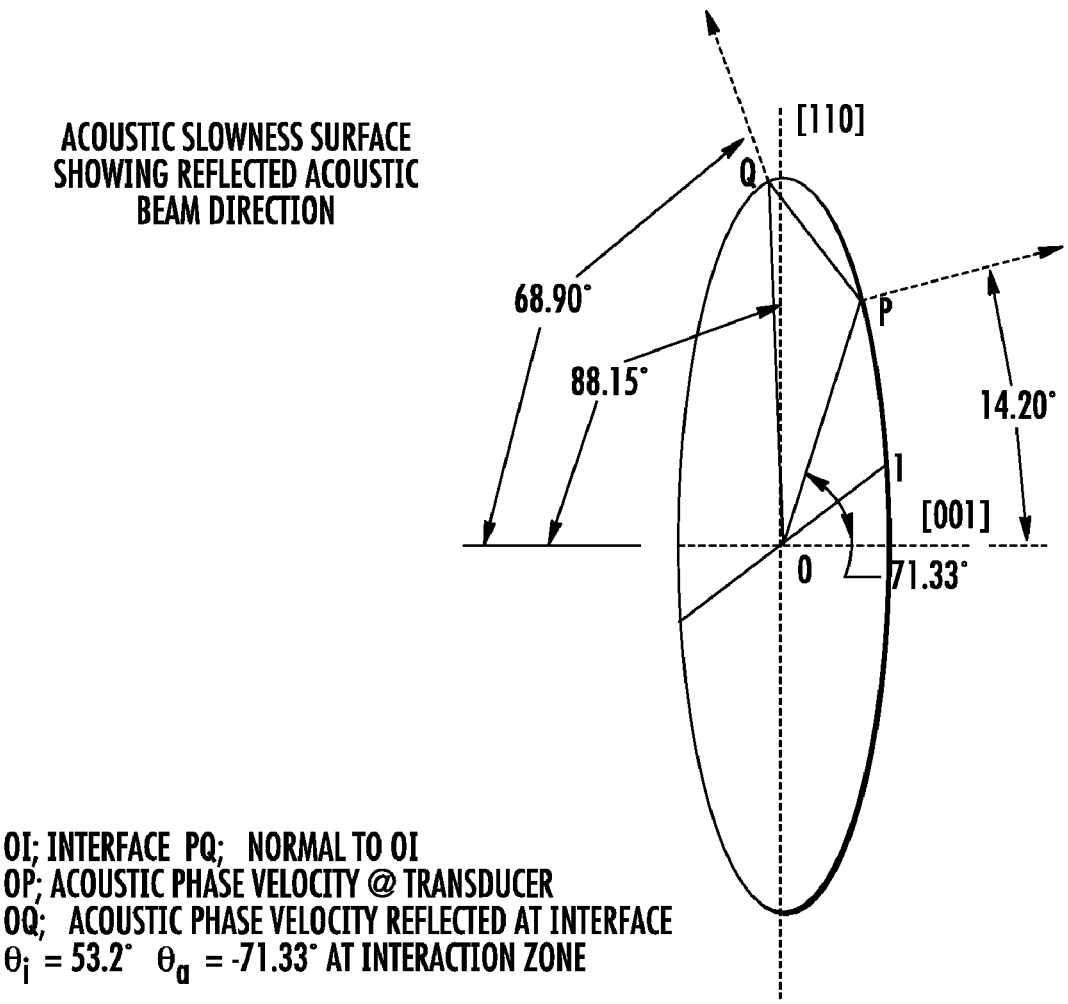
FIG. 12 shows a slice through the tz-plane of the acoustic dispersion surface for the slow shear mode in $TeO_2$ according to an embodiment of the invention showing the geometrical construction made in order to calculate the angles of the various surfaces. It is this diagram which allows determination of the direction of the reflected acoustic wave and therefore where to position the acoustic absorber 1120 shown in FIG. 11. T corresponds to the (110) direction in the crystal and z to the (001) direction.

FIG. 12 shows a slice through the tz-plane of the acoustic dispersion surface for the slow shear mode in TeO$_2$ showing the geometrical construction made in order to calculate the angles of the various surfaces. It is this diagram which allows determination of the direction of the reflected acoustic wave and therefore where to position the acoustic absorber 1120 shown in FIG. 11. T corresponds to the (110) direction and z to the (001) direction.

More specifically, FIG. 12 shows the acoustic slowness ellipse of TeO$_2$ in the [001]/[110] plane, and a method of calculation for the acoustic phase & group velocity directions. OI represents the interface and is therefore parallel to the optical faces. OP represents the phase velocity at the transducer and through the interaction zone. The construction-line PQ is normal to the interface OI. OQ therefore represents the phase velocity of the reflected acoustic beam. The respective group velocity directions are given by the normals to the ellipse at points P & Q. An AOFS based on this design was built, and found to give reasonable efficiency (>60%) at 0.3 W drive power.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

What we claim is:

1. An acousto-optic (AO) frequency shifter, comprising:
   an anisotropic crystal having an optical axis and an input face, and an acoustic transducer affixed to said input face, said transducer having electrodes for receiving an electrical signal and projecting an acoustic wave into said crystal;
   wherein said anisotropic crystal is cut relative to said input face so that said transducer is at an acoustic angle ($\theta_a$) corresponding to a predetermined angle of incidence ($\theta_i$) of an optical beam to be directed relative to said optical axis of said anisotropic crystal to substantially satisfy the parallel tangents phase matching condition, and
   wherein $-73 < \theta_a < -70$ degrees and $52 < \theta_i < 56$ degrees.

2. The frequency shifter of claim 1, wherein $-71.4 < \theta_a < -71.2$ degrees, and $54 < \theta_i < 56$ degrees.

3. The frequency shifter of claim 1, wherein said transducer is a narrowband transducer, said narrowband transducer having a fractional bandwidth of $\leq +/-15\%$.

4. The frequency shifter of claim 1, wherein said anisotropic crystal comprises TeO$_2$.

5. The frequency shifter of claim 1, further comprising an acoustic absorber on a surface of said crystal across from said transducer for absorbing acoustic power emanating from said transducer after it has traversed said crystal.

6. The frequency shifter of claim 1, wherein said crystal has its output face parallel to said input face.

7. The frequency shifter of claim 1, further comprising a first and a second retroreflector spaced apart from said frequency shifter and positioned to receive a first polarized and a second polarized frequency shifted beam provided by said frequency shifter, said first and a second retroreflector directing said first and a second frequency shifted beam back though said frequency shifter.

8. The frequency shifter of claim 1, wherein said AOFS is arranged so that said acoustic wave is reflected from one or more optical faces of said anisotropic crystal after the acousto-optic interaction.

9. A frequency shifting system, comprising:
   an acousto-optic frequency shifter (AOFS) comprising an anisotropic crystal having an optical axis and an input face;
   an acoustic transducer affixed to said input face, said transducer having electrodes for receiving an electrical signal and projecting an acoustic wave into said crystal, and
   an optical beam source for providing an optical beam, said optical beam aligned with said anisotropic crystal to be incident on said anisotropic crystal at a predetermined angle of incidence ($\theta_i$) relative to said optical axis;
   wherein said anisotropic crystal is cut relative to said input face so that said transducer is at an acoustic angle ($\theta_a$) corresponding to said predetermined angle of incidence ($\theta_i$) to substantially satisfy the parallel tangents phase matching condition, and wherein $-73 < \theta_a < -70$ degrees and $52 < \theta_i < 56$ degrees, and
   an RF source coupled to said electrodes for providing said electrical signal.

10. The system of claim 9, wherein said optical beam is a single fixed frequency beam including both e and o polarizations in substantially equal amounts, said single beam comprising a circularly polarized beam, an unpolarized beam, or a linearly polarized beam oriented at 45° relative to said optical axis.

11. The system of claim 10, wherein said anisotropic crystal comprises TeO$_2$ and said system is operated in a polarization independent condition to obtain two simultaneous output optical beams, one up-shifted and one down-shifted by equal amounts.

12. The system of claim 9, wherein said transducer is a narrowband transducer, said narrowband transducer having a fractional bandwidth of $\leq +/-15\%$.

13. The system of claim 9, further comprising acoustic absorber on a surface of said crystal across from said transducer for absorbing acoustic power emanating from said transducer after it has traversed said crystal.

14. The system of claim 9, wherein said crystal has its output face parallel to said input face.

15. The system of claim 9, further comprising a first and a second retroreflector spaced apart from said frequency shifter and positioned to receive a first polarized and a second polarized frequency shifted beam provided by said frequency shifter, said first and a second retroreflector directing said first and a second frequency shifted beam back though said frequency shifter.

16. The system of claim 9, wherein said AOFS is arranged so that said acoustic wave is reflected is reflected from one or more optical faces of said anisotropic crystal after the acousto-optic interaction.

17. A method of frequency shifting an optical beam using an acousto-optic device, comprising the steps of:
   interacting a traveling acoustic wave having a fixed frequency of at least 100 MHz with a single polarized optical beam in an anisotropic crystal having an optical axis and an input face, wherein parameters of said acoustic wave and said optical beam substantially satisfy the parallel tangents phase matching condition wherein said anisotropic crystal is cut relative to said input face so that said transducer is at an acoustic angle ($\theta_a$) corresponding to a predetermined angle of incidence ($\theta_i$) of said singly polarized optical beam relative to said optical axis of said anisotropic crystal to substantially satisfy said parallel tangents phase matching condition, and wherein $-73 < \theta_a < -70$ degrees and $52 < \theta_i < 56$ degrees, and
   wherein said interacting generates a pair of orthogonally polarized output beams, each of said orthogonally polarized output beams having an equal and opposite frequency shift relative to an input optical frequency of said optical beam, and wherein a total frequency shift between said pair of orthogonally polarized output beams is twice a frequency of an input radio frequency signal applied to an acoustic transducer coupled to said anisotropic crystal.

18. The method of claim 17, further comprising the step of reflecting said pair of output beams back to repeat said interacting, so as to double a frequency separation between said pair of output beams without using increased acoustic drive power.

19. The method of claim 18, wherein said frequency separation is over 1 GHz.

20. The method of claim 17, further comprising the step of reflecting said acoustic wave from one or more optical faces of said anisotropic crystal after said interacting step.

21. The method of claim 17, wherein said optical beam is a single fixed frequency beam which includes both e and o polarizations in substantially equal amounts.

22. The method of claim 21, wherein said single fixed frequency beam is a circularly polarized beam, an unpolarized beam, or a linearly polarized beam oriented at 45° relative to said optical axis.

\* \* \* \* \*